United States Patent [19]

Tsuzuki et al.

[11] Patent Number: 4,882,596

[45] Date of Patent: Nov. 21, 1989

[54] ON DEMAND TYPE INK-JET PRINT HEAD HAVING FLUID CONTROL MEANS

[75] Inventors: Mitsuo Tsuzuki; Michihisa Suga, both of Tokyo, Japan

[73] Assignee: NEC Corporation, Japan

[21] Appl. No.: 243,227

[22] Filed: Sep. 2, 1988

[30] Foreign Application Priority Data

Aug. 31, 1983 [JP] Japan .............................. 58-159819
Aug. 31, 1983 [JP] Japan .............................. 58-159820

Related U.S. Application Data

[63] Continuation of Ser. No. 133,193, Dec. 15, 1987, abandoned, which is a continuation of Ser. No. 928,624, Nov. 4, 1986, abandoned, which is a continuation of Ser. No. 827,471, Feb. 5, 1986, abandoned, which is a continuation of Ser. No. 646,377, Aug. 29, 1984, abandoned.

[51] Int. Cl.[4] .......................... G01D 15/16; B41J 3/04
[52] U.S. Cl. ................................................ 346/140 R
[58] Field of Search ............................................ 346/140

[56] References Cited

U.S. PATENT DOCUMENTS 4,216,477 8/1980 Matsuda ............................. 346/140
4,233,610 11/1980 Fischbeck .......................... 346/140
4,379,304 4/1983 Heinzl ................................ 346/140
4,509,059 4/1985 Howkins ......................... 346/140 X
4,514,742 4/1985 Suga .................................. 346/140

*Primary Examiner*—Joseph W. Hartary
*Attorney, Agent, or Firm*—Laff, Whitesel, Conte & Saret

[57] ABSTRACT

An on-demand type ink-jet print head requires only a small amount of energy for the droplet formation. A pressure chamber is filled with ink and a transducer or electromechanical conversion element applies a pressure on the ink pressure chamber. A fluid rectifier element (here, a check valve) is provided between the ink supply inlet and the pressure chamber so that a forwardly directed resistance is applied to ink flowing from the ink supply inlet to the pressure chamber and a reversely directed resistance is applied to ink flowing from the pressure chamber to the ink supply inlet. A fluid resistance element (here, a plate with many pinholes) is provided between the pressure chamber and the nozzle. The resistance of the fluid resistance element is greater than the forwardly directed resistance of the rectifier element.

9 Claims, 2 Drawing Sheets

Figure 3A:
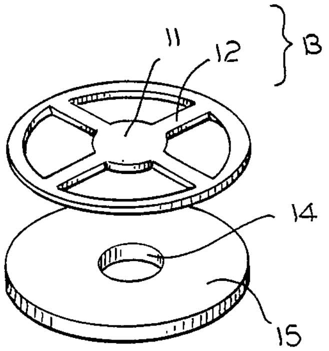

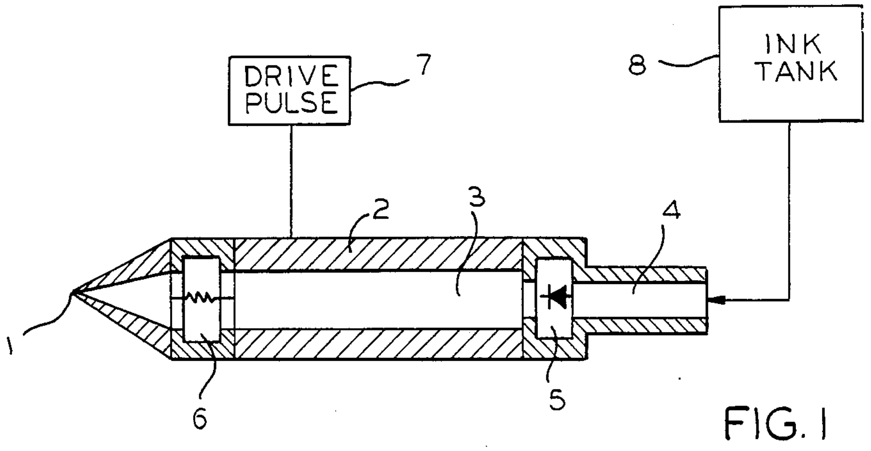
FIG. 1
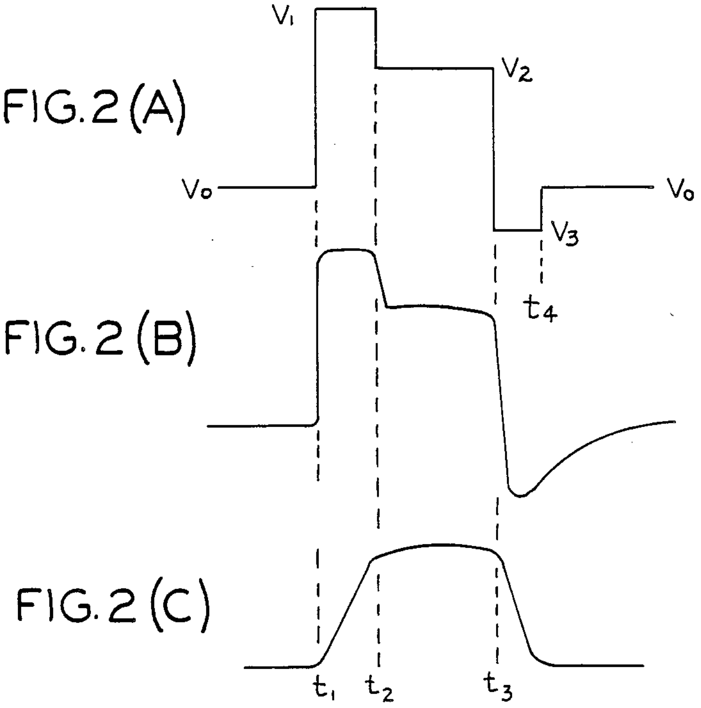
FIG. 2 (A)
FIG. 2 (B)
FIG. 2 (C)

ON DEMAND TYPE INK-JET PRINT HEAD HAVING FLUID CONTROL MEANS

This application is a continuation of application Ser. No. 133,193 filed 12/15/87, which was a continuation of Ser. No. 928,624 filed 11/4/86, which was a continuation of Ser. No. 827,471 filed 2/5/86, now abandoned which was a continuation of Ser. No. 646,377 filed 8/29/84, now abandoned.

This invention relates to an on-demand type ink-jet print head, and more particularly, to an on-demand type ink-jet print head having fluid control means.

Various types of ink-jet print heads have been proposed as disclosed in an article entitled *Ink Jet Printing*, by Fred J. Kamphoefner, published in the IEEE TRANSACTIONS ON ELECTRON DEVICES, Vol. ED-19, No. 4, April 1972, pp. 584–593. An ink-jet print head of an on-demand type is disclosed in U.S. Pat. No. 3,946,398 entitled *Method and Apparatus for Recording with Written Fluids and Drop Projection Means Therefor*, issued to E. L. Kyser, et al.

In such a conventional on-demand type ink-jet print head, a nozzle and an ink supply inlet are connected to a pressure chamber on which a piezoelectric element is mounted. When a pressure pulse is generated in the pressure chamber by applying a driving pulse to the piezoelectric element, ink is pushed out of the nozzle to be ejected as an ink droplet. The ink pressure from the pressure chamber also acts on the ink supply inlet to produce an ink flow from the ink supply inlet to the ink tank. When the driving pulse applied to the piezoelectric element terminates, the transformed pressure chamber tends to return to its original state, which produces a negative pressure and draws ink into the pressure chamber, from the outside. Thus, ink flows into the pressure chamber from both the nozzle and the ink supply inlet. In the nozzle part, the meniscus is drawn inside to a position which is away from the end of the nozzle. The meniscus drawn into the nozzle returns to the end of the nozzle due to the effect of surface tension. The amount of ink that is drawn into the nozzle is approximately equal to the volume of an ink droplet that is ejected. The amount of ink that is returned by movement of the meniscus to the end of the nozzle is considered to be substantially equal to the ink supply.

The droplet formation in the conventional on-demand type ink-jet print head has involved several problems. One problem is that, since the ink supply depends upon the surface tension of the meniscus, there is a limitation in ink-droplet velocity. It is impossible to shorten the droplet formation period to become less than the ink supply time. That is, the droplet formation frequency cannot be increased. Another problem is that the ink pressure produced by the transformation of the pressure chamber acts, not only on the nozzle part, but also on the ink supply inlet, thus causing the ink to flow out. Thus, the amount of the piezoelectric-element deformation increases and there is a large loss of energy which is not attributable to droplet formation.

It is, therefore, an object of this invention to provide an on-demand type ink-jet print head for ejecting ink droplets at a high droplet formation frequency.

It is another object of this invention to provide an on-demand type ink-jet print head in which a small energy is required for the droplet formation.

According to this invention, an on-demand type ink-jet print head comprises a nozzle for ejecting ink droplets. A pressure chamber is filled with ink. An electromechanical conversion element or transducer applies a pressure on the ink pressure chamber. An ink supply inlet is connected to the pressure chamber with a fluid resistance element provided between the nozzle and the pressure chamber. A fluid rectifier element is provided between the ink supply inlet and the pressure chamber so that a forward-direction resistance is applied to ink flowing from the ink supply inlet to the pressure chamber and a reverse-direction resistance is applied to ink flowing from the pressure chamber to the ink supply inlet. A fluid resistance of the fluid resistance element is greater than the forward-direction resistance.

Figure 3B:
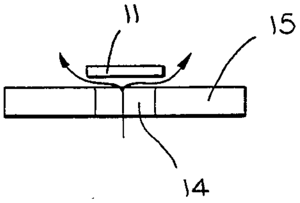
Figure 3C:
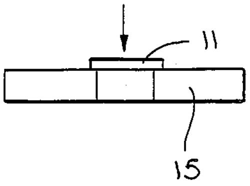
Figure 4:
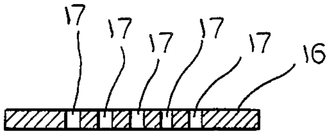

Other features and advantages of this invention will be apparent from the following description of a preferred embodiment of this invention taken in conjunction with the accompanying drawings, wherein:

FIG. 1 is a cross sectional view of an embodiment of this invention;

FIGS. 2(A), 2(B) and 2(C) are time charts for illustrating an operation of the embodiment shown in FIG. 1;

FIGS. 3(A), 3(B) and 3(C) are perspective views, and side views of a valve used as a fluid rectifier element in the embodiment shown in FIG. 1, respectively; and FIG. 4 is a cross sectional view of a fluid resistance element used in the embodiment shown in FIG. 1.

Referring to FIG. 1, an embodiment of this invention comprises a nozzle 1, a pressure chamber 3, an electromechanical conversion or transducer element 2 such as a cylindrical piezoelectric element or a magnetrostrictive element, an ink supply inlet 4 connected to an ink tank, a fluid rectifier element 5 such as a check valve for checking the ink flow in the direction of the ink supply inlet 4, a fluid resistance element 6 such as a plurality of pinholes, a driving pulse generator 7, and an ink tank 8. The fluid rectifier element 5 is installed between the pressure chamber 3 and the ink supply inlet 4 so that a forward-direction resistance is applied to the ink flowing from the ink supply inlet 4 to the pressure chamber 3 and a much higher reverse-direction resistance is applied to the ink flowing from the pressure chamber 3 to the ink supply inlet 4. Fluid resistances of the fluid resistance element 6 are equal to each other with respect to both directions of the ink flow, that is, a first or forward direction is from the pressure chamber 3 to the nozzle 1 and an opposite or reverse direction is from the nozzle 1 to the pressure chamber 3. The fluid resistance of the fluid resistance element 6 is greater than the forward-direction resistance of the fluid rectifier element 5. In FIG. 1, the fluid rectifier element 5 and the fluid resistance element 6 are shown in the respective symbolic forms for simplicity.

When the ink droplet is to be ejected from the nozzle 1, a driving pulse is applied from the driving pulse generator 7 to the piezoelectric element 2. As shown in FIG. 2(A), the driving pulse has a first portion of highest voltage $V_1$, a second portion of an intermediate voltage $V_2$, and a third portion of the lowest voltage $V_3$. The voltage of the driving pulse becomes to a reference voltage $V_0$ at which a pressure is not applied to the ink in the pressure chamber 3 when the driving pulse is terminated.

When the driving pulse shown in FIG. 2(A) is applied to the piezoelectric element 2, the pressure in the pressure chamber 3 is varied as shown in FIG. 2(B). The velocity of the droplet ejected from the nozzle 1 is varied as shown in FIG. 2(C). As clearly understood from FIGS. 2(A), 2(B) and 2(C), the highest voltage $V_1$ is applied to the piezoelectric element 1 at a starting time period (time point $t_1$ to time point $t_2$) of the ejection period. The pressure in the pressure chamber 3 can be readily increased and, therefore, the droplet velocity can also be increased to a desired value within the starting period $t_1 - t_2$. At the time point $t_2$, that is, when the desired droplet velocity is to be obtained, the voltage of the driving pulse becomes an intermediate value $V_2$, whereby the pressure in the pressure chamber 3 also decreases, but the droplet velocity is maintained at the desired value.

When the ejection of the ink droplet is to be terminated, the voltage $V_3$ becomes lower than the reference voltage $V_0$. The application of the lower than reference voltage makes the capacity of the pressure chamber 3 larger than its original capacity, which is to be obtained at a time when the driving pulse is not applied, that is, the voltage of the piezoelectric element 2 is the reference voltage $V_0$. The amount of ink exceeding the original capacity is determined by the difference in value between the reference voltage $V_0$ and the lowest voltage $V_3$ and by the applying time period ($t_4 - t_3$). The excess amount of ink is made substantially equal to the amount of ink which is drawn inside the nozzle 1 after the ink ejection.

When the voltage of the driving pulse is restored to the reference voltage $V_0$ at the time point $t_4$, the capacity of the pressure chamber 3 is restored to the original state. At this time, the ink drawn inside the pressure chamber 3 is pushed back and in the direction of the nozzle. The meniscus drawn inside the nozzle 1 can immediately return to the end of the nozzle 1. As described above, the use of the driving pulse as shown in FIG. 2(A) shortens the time period required for the ink supply and enables the ink ejection to occur at a higher ink-droplet formation frequency.

Referring to FIG. 3(A), the check valve used as the fluid rectifier element 5 in the above-mentioned embodiment comprises a valve member 13 including a valve plate 11 and arms 12, and a valve seat 15 having a flow path 14. The valve member 13 overlaps the valve seat 15. As shown in FIG. 3(B), valve 11 is pushed up for the forward flow when the ink is caused to flow between the valve 11 and the valve seat 15. As shown in FIG. 3(C), the valve is pushed against the valve seat to stop the backward flow of the ink flow.

Referring to FIG. 4, the fluid resistance element 6 is made of a plate of material 16 in which a multiplicity of minute holes 17 are formed. Since a high-speed operation is required as a characteristic of the ink droplet ejection for the ink-jet print head, inertia resistance from the pressure chamber to the end of the nozzle should preferably be small. To this end, in this case, forty holes were made approximately 5–10 μm in diameter and about 10 μm in length. When the ink of 2 cp was used, the flow rate was 1–5 $mm^3/s$ under an atmospheric pressure of 0.5 i.e., negative pressure is applied to inside the chamber 3 so as to supply the ink to the chamber 3 after the ink droplet ejection. When a head is used having a 50 μm nozzle diameter and 50 μm nozzle length, the fluid resistance element 6 and the fluid rectifier element 5 with a flow property in the forward direction of about 30 $mm^3/s$, which is 6 to 30 times as large as the flow rate (1–5 $mm^3/s$) of the fluid resistance element 6, under an atmospheric pressure of 0.5 and approximately fifty times in commutation ratio, was experimentally made. The volume of the ink was variable over 15 μsec–50 μsec in voltage pulse width and ink droplet formation was performed with little variability of droplet velocity up to a level of 10 KHz in frequency.

Those who are skilled in the art will readily perceive how to modify the invention. Therefore, the appended claims are to be construed to cover all equivalent structures which fall within the true scope and spirit of the invention.

What is claimed is:

1. An on-demand ink-jet printing head comprising an ink supply coupled to a nozzle via an ink delivery path; said delivery path comprising in series an inlet from said ink supply, fluid rectifier means for enabling substantially a one-way flow of ink in said deliver path, said one way flow being in a direction from said supply toward said nozzle, transducer means, a pressure chamber controlled by said transducer means, said rectifier means comprising a check valve for passing ink from said ink supply through said inlet to said pressure chamber while blocking the flow of the ink from said pressure chamber through said inlet, bi-directional fluid resistance means comprising a wall member having a plurality of pinholes therein through which said ink must flow between said pressure chamber and said nozzle for impeding the free flow of said ink by substantially the same impedance in both a forward and a reverse direction of ink flow, a passageway leading to said nozzle; means for applying drive pulses to said transducer means for selectively pressurizing said chamber to eject an ink droplet from said nozzle, said pressure chamber having a normal volume when no drive pulse is applied thereto, said drive pulse applying means comprising a pulse generator for forming pulses having a high initial voltage level relative to a reference level in order to increase droplet velocity by squeezing said chamber to less than said normal volume for acceleration an ink droplet to a given velocity, said pulse thereafter dropping to an intermediate voltage level which is lower than said high level and higher than said reference level in order to reduce chamber pressure without decreasing droplet velocity, said intermediate level thereafter dropping to a low voltage level which is below said reference level in order to increase the volume of said pressure chamber to larger than a normal chamber volume, and said drive pulse terminating by returning from said low voltage level said reference lever in order to return the volume of said pressure chamber.

2. The on-demand ink-jet printing head of claim 1 wherein said check valve comprises a valve seat in the form of a plate with a hole in it, and an elastic member having a plate member for covering or uncovering said hole and a plurality of arms for normally holding said plate member in contact with the plate surrounding said hole, said arms being sufficiently elastic to enable said member to open and close said hole responsive to fluid pressure applied to opposite sides of said elastic member.

3. The on-demand ink jet printing head of claim 1 wherein there are approximately forty of said pinholes, each having a diameter in the range of about 5–10 μm and a length of about 10 μm.

4. The on-demand ink-jet printing head of claim 1 wherein the flow rate of ink through said pinholes is about 1–5 $mm^3/s$ under approximately 0.5 atmospheric pressure.

5. The on-demand ink-jet printing head of claim 4 wherein said nozzle has an outlet diameter of about 50 μm and a length of about 50 μm.

6. The on-demand ink-jet printing head of claim 1 wherein said pressure chamber comprises a chamber having a wall which may be squeezed into said chamber or expanded from said chamber responsive to an operation of said transducer means, whereby the volume of said chamber may be squeezed to eject ink therefrom or enlarged to draw ink back into said chamber.

7. The on-demand jet printing head of claim 6 wherein said transducer means, said pressure chamber, and said drive pulse are interrelated so that said high initial voltage causes said transducer to squeeze said pressure chamber with sufficient force to sharply begin an ejection of an ink droplet, said intermediate level continues for a time period which controls the volume of said ink droplet and said low voltage causes said transducer to expand said pressure chamber and draw ink back into said chamber to sharply terminate the formation of said droplet.

8. The on-demand ink-jet printing head of claim 6 wherein said transducer means, pressure chamber and drive pulse are interrelated to form a variable volume ink droplet in a time period which is approximately 15 μsec to 50 μsec.

9. An on-demand type ink-jet print head for ejecting ink droplets comprising:

a nozzle for ejecting said ink droplets;

a pressure chamber filled with ink;

an electromechanical transducer for applying pressure to said ink in said pressure chamber so as to eject said ink droplets;

an ink supply inlet connected to said pressure chamber for supplying said ink to said pressure chamber so that an ink flow path is formed in said ink supply inlet, said pressure chamber and said nozzle, said ink flowing in said ink flow path in a forward direction from said ink supply inlet toward said nozzle and a reverse direction from said nozzle toward said ink supply inlet;

a fluid rectifier element provided on said ink flow path at a portion between said ink supply inlet and said pressure chamber so that first flow resistance is applied to said ink flowing in said forward direction and second flow resistance greater than said first flow resistance is applied to said ink flowing in said reverse direction; and a fluid resistance element provided on said ink flow path at a portion between said pressure chamber and said nozzle so that third flow resistance is applied to said ink flowing in both said forward and reverse directions;

said first flow resistance of said fluid rectifier element being less than about one-sixth of said third flow resistance of said fluid resistance element when said ink is supplied to said pressure chamber after the ink droplets ejection.

* * * * *